US008202646B2

United States Patent
Ishikawa et al.

(10) Patent No.: US 8,202,646 B2
(45) Date of Patent: Jun. 19, 2012

(54) BATTERY CAN WITH CUTTING-EDGE PORTION HIGHER THAN CUTTING START PORTION, MANUFACTURING METHOD AND MANUFACTURING DEVICE THEREFORE, AND BATTERY USING THE SAME

(75) Inventors: Toshiki Ishikawa, Osaka (JP); Yoshio Goda, Osaka (JP); Tadahiro Tokumoto, Osaka (JP); Masaji Moriwaki, Osaka (JP); Seiichi Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 12/602,732

(22) PCT Filed: Jan. 22, 2009

(86) PCT No.: PCT/JP2009/000226
§ 371 (c)(1),
(2), (4) Date: Dec. 2, 2009

(87) PCT Pub. No.: WO2009/107318
PCT Pub. Date: Sep. 3, 2009

(65) Prior Publication Data
US 2010/0183911 A1 Jul. 22, 2010

(30) Foreign Application Priority Data

Feb. 25, 2008 (JP) ................................ 2008-042469
Jun. 26, 2008 (JP) ................................ 2008-166815

(51) Int. Cl.
*H01M 2/00* (2006.01)
*H01M 2/02* (2006.01)
*H01M 2/04* (2006.01)
*H01M 6/08* (2006.01)
*B21C 1/00* (2006.01)
*B21H 1/18* (2006.01)

(52) U.S. Cl. ........ 429/164; 429/163; 429/176; 428/544; 428/577; 428/586

(58) Field of Classification Search .................. 429/164, 429/163, 176; 428/544, 577, 586
See application file for complete search history.

(56) References Cited

U.S. PATENT DOCUMENTS
2006/0083981 A1* 4/2006 Mori et al. ..................... 429/164

FOREIGN PATENT DOCUMENTS
JP 10-076418 A 3/1998
(Continued)

OTHER PUBLICATIONS

Mori, K., Machine translation of JP 2008-166190 A, Jul. 2008.*

*Primary Examiner* — Basia Ridley
*Assistant Examiner* — Sean P Cullen
(74) *Attorney, Agent, or Firm* — McDermott Will & Emery LLP

(57) ABSTRACT

A battery case is made by cutting from a blank case of a bottomed cylindrical battery case having an unwanted portion at an opening portion the unwanted portion from the case wall in the circumferential direction by a blade. The cutting of the case wall is performed so as to render a cutting-end portion higher than a cutting-start portion. Thus, re-cutting of the cutting-start portion by the blade after it has already completed one rotation can be avoided. As a result, the generation of thread-like chips from re-cutting of the cut surface can be avoided.

14 Claims, 9 Drawing Sheets

FOREIGN PATENT DOCUMENTS

| | | |
|---|---|---|
| JP | 10-076420 A | 3/1998 |
| JP | 10-080819 A | 3/1998 |
| JP | 2001-307686 A | 11/2001 |
| JP | 2005-161426 A | 6/2005 |
| JP | 2005-288631 A | 10/2005 |
| JP | 2008-166190 A | 7/2008 |
| WO | WO 2008/081671 A1 | 7/2008 |

* cited by examiner

F I G. 6
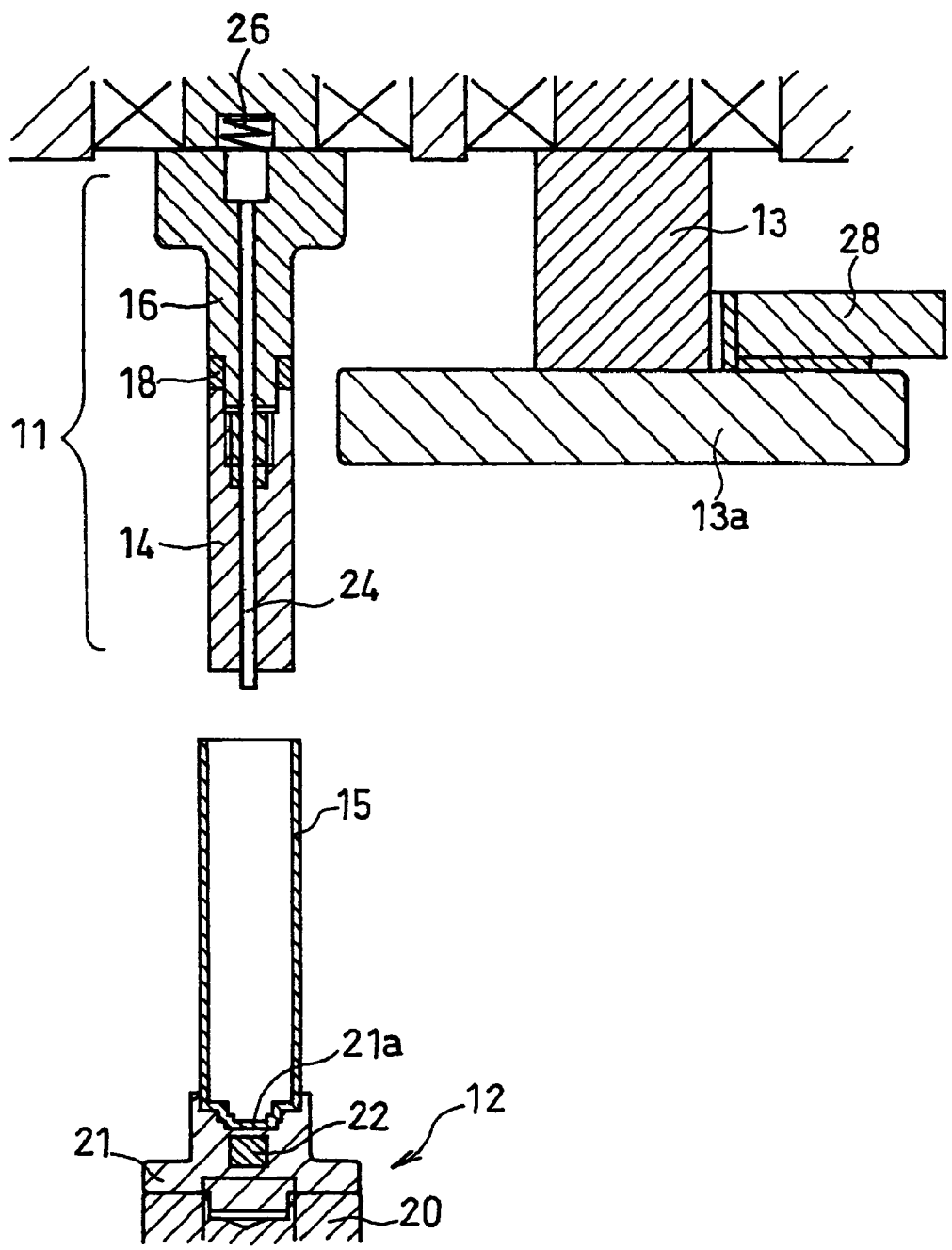

US 8,202,646 B2

BATTERY CAN WITH CUTTING-EDGE PORTION HIGHER THAN CUTTING START PORTION, MANUFACTURING METHOD AND MANUFACTURING DEVICE THEREFORE, AND BATTERY USING THE SAME

RELATED APPLICATIONS

This application is the U.S. National Phase under 35 U.S.C. §371 of International Application No. PCT/JP2009/000226, filed on Jan. 22, 2009, which in turn claims the benefit of Japanese Application Nos. 2008-042469, filed on Feb. 25, 2008 and 2008-166815, filed Jun. 26, 2008, the disclosures of which Applications are incorporated by reference herein.

TECHNICAL FIELD

The present invention relates to a battery case manufactured by cutting off an unwanted portion of an opening portion from a blank case of a bottomed cylindrical battery case, a manufacturing method and a manufacturing device for the battery case, and a battery manufactured using the battery case.

BACKGROUND ART

With recent further increases in demand for higher capacity and lighter weight batteries, improvements in the volume ratio and reduction in the weight of batteries have been in greater demand than ever, even for battery cases that house a power-generating element. To attend to such demands, battery cases are manufactured mainly by the drawing and ironing process, by which a thin can be made with a small amount of material.

In the drawing and ironing process, a steel plate is punched into a circular blank and processed by drawing at the same time to form a bottomed cylindrical can member, and then the can member is processed by ironing to mold the blank of a bottomed cylindrical battery case (hereinafter, referred to as a "blank case") that is thin-walled and long in the axial direction. Wavy projections (earring) are formed, due to anisotropic materials, at the opening end portion of the blank case molded by the drawing and ironing process. Thus, the earring is removed and the opening end portion is shaped by cutting the opening end portion of the blank case, so as to shorten a slighter longer blank case to a predetermined size.

FIG. 17 shows a can manufacturing device (trimmer) that is used for such cutting processes (see Patent Documents 1 and 2). A trimmer 100 shown as an example in the figure has a mandrel 102 on which a blank case 101 is fitted to position the aluminum beverage can of the blank case 101, and a main shaft 103, to which the mandrel 102 is mounted.

The main shaft 103 is connected to an external blade supporting shaft 104 via a gear and the like, so as to rotate along with the external blade supporting shaft 104. On the other hand, a toroidal internal blade 105 is provided at the proximal end portion of the mandrel 102. The internal blade 105 and an arc-shaped external blade 106 that is supported by the external blade supporting shaft 104 overlap with a predetermined clearance therebetween, and cut the case wall of the blank case 101 sandwiched therebetween in the circumferential direction.

The mandrel 102 has a hollow structure, and a plurality of suction holes are formed along the peripheral wall, and the hollow portion is connected to a suction device. By sucking air through the hollow portion of the mandrel 102 with the suction device, the case wall of the blank case 101 is suctioned onto the peripheral surface of the mandrel 102.

The above-described suction holes are opened in a plurality of strip-like grooves that extend in the axial direction and are provided at the peripheral surface of the mandrel 102, and the suctioned blank case 101 deforms in accordance with the shape of the grooves. This prevents the blank case 101 from idling with respect to the mandrel 102 while cutting.

Patent Document 1: Japanese Laid-Open Patent Publication No. Hei 10-76420
Patent Document 2: Japanese Laid-Open Patent Publication No. Hei 10-76418

DISCLOSURE OF THE INVENTION

Problem to be Solved by the Invention

However, when a blank case of a harder material other than aluminum is used in the above-described conventional can manufacturing device, the case wall of the blank case does not deform in accordance with the above-described grooves, and it is difficult to hold the blank case without idling occurring. For example, when a blank case that is made by molding a cold rolled steel plate using the drawing and ironing process, it is difficult to hold the blank case without idling occurring.

Furthermore, it is possible to allow the case wall to follow the above-described grooves even with a material that is harder than aluminum, as long as the blank case has a case wall with a small thickness. However, the case wall of the blank case is distorted in this case, giving a disadvantageous appearance.

Also, in any of the above-described cases, it is not easy to hold the blank case with a holding strength that is higher than the cut resistance at the time of cutting the metal case wall just by holding the can with the suction force of air. Thus, the blank case slips with respect to the mandrel while cutting, making it difficult to cut accurately. Furthermore, because the blank case is held unstably, there is also a problem in that the heights of the burrs generated at the time of cutting increase.

Then, when a can with tall burrs is used as the battery case, when inserting an electrode plate group that is spirally wound into the battery case during the battery assembly process, the outer peripheral surface of the electrode plate group may be damaged by the burrs. Also, when the burrs fall inside the battery case, an internal short circuit occurs at the time of charge and discharge after battery assembly, which may cause abnormal heat generation and disruption in the battery case. Thus, the generation of tall burrs causes a reduction in battery safety.

Furthermore, in the can manufacturing device shown in Patent Documents 1 and 2, while allowing a toroidal internal blade abutting the case wall from inside the blank case and an arc-shaped external blade abutting the case wall from outside the blank case to overlap with a predetermined clearance therebetween, the blank case, the internal blade, and the external blade are rotated, thereby cutting the case wall in the circumferential direction.

At this time, the cut resistance is high in the initial period of cutting until the external blade cuts through the case wall of the blank case and, afterwards, the cut resistance decreases. Therefore, it is difficult to perform cutting while keeping deflection of the main shaft constant. That is, because the cut resistance is high in the initial stages of cutting, the main shaft is easily deflected, and the actual clearance becomes wider than the clearance that was originally set. On the other hand, when completing the cutting, the cut resistance is small and the actual clearance and the clearance that was set become substantially equal. When the clearance widens due to deflection of the main shaft, the cut surface is formed at a slightly higher position, than when the clearance is relatively narrower. Also, the cut resistance in the initial stages of cutting causes elastic deformation in the proximity of the opening portion. Thus, when cutting the case wall of the blank case in the circumferential direction, it is extremely difficult to complete cutting so as to render the cutting-start portion and the cutting-end portion of the cut surface within the same plane without a dimensional error.

As a result, re-cutting occurs, in which the cutting-start portion is cut again by a blade that has already completed one rotation.

When such re-cutting occurs, as shown in FIG. 18, thin thread-like chips 110 are generated at a cut surface 108 of the case wall. When the chips remain and are left attached to the outside of the battery case, there is a possibility that an external short circuit might occur after battery assembly, in which the positive electrode terminal and the negative electrode terminal are short circuited.

Also, there is a danger that thermal runaway might occur, due to these chips entering the inside of the battery case and piercing the separator disposed at the outermost periphery of the electrode plate group, causing the positive electrode plate and the negative electrode plate to short circuit. Therefore, preventing the generation of chips is a quite significant task at the time of cutting.

Furthermore, because the burrs generated at the cut surface are also a factor in the occurrence of external battery short circuits in addition to the generation of the above-described chips, it is quite important to perform cutting so as to reduce the height of any burrs.

The present invention has been made in consideration of the above conventional problems, and an object of the present invention is to provide a battery case that is made by cutting off an unwanted portion from the opening portion of the blank case, wherein the height of a burr formed at the time of cutting is kept low, and the generation of chips caused by re-cutting the cut surface is prevented.

Another object of the present invention is to provide a method and a device for manufacturing a battery case, in which the height of a burr can be kept low and the generation of chips caused by re-cutting the cut surface can be prevented when making a battery case by cutting off an unwanted portion from the opening portion of the blank case.

Another object of the present invention is to provide a highly safe battery using the above-described battery case.

Means for Solving the Problem

To achieve the above objects, a battery case of the present invention is configured such that in a battery case made by cutting from a blank case of a bottomed cylindrical battery case having an unwanted portion at an opening portion the unwanted portion, a cutting-end portion is higher than a cutting-start portion in a cut surface formed by cutting the case wall of the blank case in the circumferential direction so as to cut off the unwanted portion.

In a preferable embodiment of the battery case of the present invention, the cutting-end portion is higher than the cutting-start portion by 10 to 50 μm in the cut surface.

In another preferable embodiment of the battery case of the present invention, the cut surface includes a shear surface and a fracture surface, wherein the ratio of the shear surface relative to the entire cut surface is in the range of 0.90 to 0.50.

The present invention also provides a battery formed by inserting a positive electrode, a negative electrode, a separator interposed between the positive electrode and the negative electrode, and an electrolyte into the above-described battery case.

In a preferable embodiment of the battery of the present invention, the positive electrode includes a positive electrode plate made by applying a positive electrode material mixture slurry onto a positive electrode current collector, the positive electrode material mixture slurry being made by kneading and dispersing an active material containing a lithium-containing composite oxide, a conductive material, and a binder in a dispersion medium;

the negative electrode includes a negative electrode plate made by applying a negative electrode material mixture slurry onto a negative electrode current collector, the negative electrode material mixture slurry being made by kneading and dispersing an active material including a material capable of retaining lithium, and a binder in a dispersion medium; and the electrolyte includes a non-aqueous electrolyte.

Furthermore, the present invention also provides a method for manufacturing a battery case by cutting from a blank case of a bottomed cylindrical battery case having an unwanted portion at an opening portion the unwanted portion, wherein the step of cutting the unwanted portion is performed by cutting the case wall of the blank case in the circumferential direction so as to render a cutting-end portion higher than a cutting-start portion in a cut surface.

Furthermore, the present invention also provides a device for manufacturing a battery case by cutting from a blank case of a bottomed cylindrical battery case having an unwanted portion at an opening portion the unwanted portion, the device including:

a blank case supporting means that supports the blank case rotatably;

a circular internal blade that abuts the case wall of the blank case from inside;

an internal blade supporting means that supports the internal blade rotatably;

an arc-shaped external blade that abuts the case wall of the blank case from outside so as to overlap the internal blade with a predetermined clearance in therebetween; and an external blade supporting means that rotatably supports the external blade;

wherein the external blade is shaped so that in a cut surface formed by cutting the case wall of the blank case in the circumferential direction with the internal blade and the external blade, a cutting-end portion is higher than a cutting-start portion.

In a preferable embodiment of the device for manufacturing a battery case of the present invention, the external blade is formed so that a ridgeline of a cutting edge extending in the circumferential direction of rotation tilts away from a plane perpendicular to the axial direction of rotation.

In another preferable embodiment of the device for manufacturing a battery case of the present invention, the external diameter of the internal blade is set so that the clearance between the cutting edge of the internal blade and the inner peripheral surface of the blank case is in the range of 20 μm to 50 μm.

In another preferable embodiment of the device for manufacturing a battery case of the present invention, the blank case supporting means includes:

a pair of spindles that are coaxially disposed, the pair of spindles including one spindle on which the blank case is fitted, and the other spindle including a recess portion in which the bottom portion of the blank case is fitted;

wherein the blank case is supported by the one spindle and the other spindle so as to sandwich the bottom portion of the blank case.

Furthermore, in another preferable embodiment of the device for manufacturing a battery case of the present invention, the other spindle includes a magnetic force generating means that generates a magnetic force so as to attract the blank case fitted in the recess portion.

Furthermore, in another preferable embodiment of the device for manufacturing a battery case of the present invention, the ratio of the circumferential velocity of the cutting edge of the external blade relative to the circumferential velocity of the inner peripheral surface of the blank case is in the range of 1.0 to 1.2.

Furthermore, in another preferable embodiment of the device for manufacturing a battery case of the present invention, at least a portion where the recess portion is provided in the other spindle is made of a non-magnetic material, and the magnetic force generating means includes a permanent magnet buried in the portion.

Furthermore, in another preferable embodiment of the device for manufacturing a battery case of the present invention, the one spindle extendably stores a case removal pin that is urged toward the other spindle, so as to push and remove the blank case fitted thereon by allowing the leading end thereof to abut the bottom portion of the blank case from inside.

Effects of the Invention

According to the battery case of the present invention, because the cutting-end portion is higher than the cutting-start portion in the cut surface formed by cutting the case wall of the blank case in the circumferential direction, it is unlikely that chips that are generated by re-cutting the cutting-start portion are attached. Furthermore, because the ratio of the shear surface in the cut surface is in the range of 0.90 to 0.50, the height of burrs is kept low. Therefore, a highly safe battery case can be provided.

Furthermore, because the case wall is cut while holding the blank case by sandwiching the bottom portion of the bottomed cylindrical blank case with a pair of spindles according to the method and device for manufacturing a battery case of the present invention, even if there is a large cut resistance, cutting can be performed while preventing the blank case from slipping. In addition, because the pair of spindles support each other, even if there is a large cut resistance, deflection of the spindles can be prevented. In this way, the heights of the burrs can be minimized. Furthermore, this is less likely to cause a disadvantageous appearance compared with the case where the side wall portion of the blank case is held.

BRIEF DESCRIPTION OF THE DRAWINGS

FIG. 6 is a cross sectional view of the above manufacturing device for performing cutting processing, at a preliminary stage.

BEST MODE FOR CARRYING OUT THE INVENTION

Figure 1:
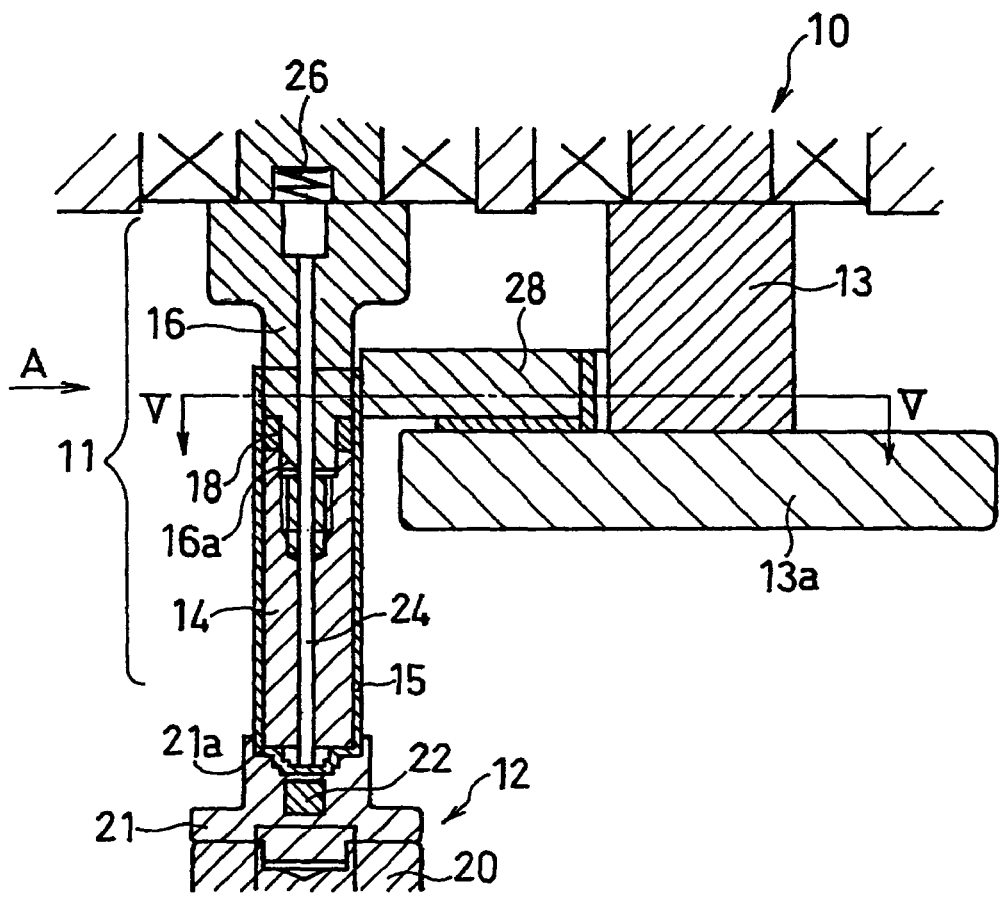
FIG. 1 is a cross sectional view illustrating a schematic configuration of a manufacturing device used in the battery case manufacturing method according to Embodiment 1 of the present invention.

The present invention relates to a battery case made by cutting an unwanted portion from a blank case of a bottomed cylindrical battery case having an unwanted portion at the opening portion. In the battery case, a cutting-end portion is higher than a cutting-start portion in a cut surface formed by cutting the case wall of the blank case in the circumferential direction so as to cut the above-described unwanted portion. In this way, the re-cutting of the cutting-start portion of the cut surface can be prevented after one round of cutting is completed. Therefore, the dangers of internal short circuit and external short circuit occurrence due to the generation of thin thread-like chips by re-cutting that are left attached to the battery case can be excluded.

At this time, the cutting-end portion of the cut surface is preferably higher than the cutting-start portion by 10 to 50 µm.

Furthermore, the cut surface is configured of a shear surface and a fracture surface. The ratio of the shear surface relative to the entire cut surface is preferably in the range of 0.90 to 0.50.

By setting the ratio of the shear surface relative to the cut surface to the above range, the height of burrs generated inside the blank case can also be kept low. Therefore, in addition to the fact that the side effects due to the above-described chips can be avoided, at the time of inserting a power generating element such as an electrode plate group inside the battery case, the danger of damaging the member disposed at the outermost periphery of the power generating element, for example, a separator, by the above-described burrs can be decreased. As a result, a further highly safe battery case can be provided.

Furthermore, the present invention relates to a battery made by inserting a positive electrode, a negative electrode, a separator interposed between the positive electrode and the negative electrode, and an electrolyte, in the above-described battery case. The battery of the present invention is made using a battery case in which chips that are generated by re-cutting the cut surface are not attached, and burrs that are generated at the cut section are small. In this way, quality defects generated at the manufacturing stages, that is, defects relating to the height of burrs; defects generated when inserting the electrode plate group in the battery case; and quality defects while using the battery can be reduced. Therefore, a high process yield and a highly safe battery can be provided.

Furthermore, by including a positive electrode using a positive electrode plate made by applying a positive electrode material mixture slurry containing an active material containing a lithium-containing composite oxide, a conductive material, and a binder kneaded and dispersed in a dispersion medium onto a positive electrode current collector; a negative electrode using a negative electrode plate made by applying a negative electrode material mixture slurry containing an active material including a material capable of retaining lithium, and a binder kneaded and dispersed in a dispersion medium onto a negative electrode current collector; and an electrolyte using a non-aqueous electrolyte; quality defects generated at the manufacturing stage of the lithium ion batteries and quality defects generated battery use can be reduced. Therefore, a high process yield and a highly safe lithium ion battery can be provided.

Furthermore, the present invention relates to a method for manufacturing a battery case by cutting from a blank case of a bottomed cylindrical battery case having an unwanted portion at an opening portion the unwanted portion. The step of cutting the above-described unwanted portion is performed by cutting the case wall of the above-described blank case in the circumferential direction, so as to render a cutting-end portion higher than a cutting-start portion in the cut surface.

In this way, re-cutting of the cutting-start portion in the cut surface can be avoided. Therefore, the dangers of generating thin thread-like chips due to re-cutting, and of internal short circuit and external short circuit occurrence from the chips left attached to the battery case can be excluded.

The present invention further relates to a device for manufacturing a battery case by cutting from a blank case of a bottomed cylindrical battery case having an unwanted portion at an opening portion the unwanted portion. The device includes a blank case supporting means that supports a blank case rotatably, a circular internal blade that abuts the case wall of the blank case from inside, an internal blade supporting means that supports the internal blade rotatably, an arc-shaped external blade that abuts the case wall of the blank case from outside so as to overlap the internal blade with a predetermined clearance therebetween, and an external blade supporting means that rotatably supports the external blade. The external blade is shaped so as to render a cutting-end portion higher than a cutting-start portion in the cut surface, when cutting the case wall of the blank case in the circumferential direction with the internal blade and the external blade.

In this way, re-cutting of the cutting-start portion in the cut surface is avoided. Therefore, the dangers of internal short circuit and external short circuit occurrence from the generation of thin thread-like chips due to re-cutting that are left attached to the battery case can be excluded.

To be more specific, the external blade is shaped so that the ridgeline of the cutting edge extending in the circumferential direction of rotation tilts away from a plane perpendicular to the axial direction of rotation.

The concept of a cutting-start and a cutting-end is described further in detail using the case where the above-described manufacturing device is used as an example. In the aforementioned manufacturing device, the cutting starts after the cutting edge of the external blade abuts the outer peripheral surface of the blank case, as the edge cuts through the inner peripheral surface of the blank case. The cutting-start portion and the cutting-end portion are formed adjacently, on both sides of the track of the cutting edge of the external blade, the track being a borderline starting when the edge abuts the outer peripheral surface of the blank case and ending when the edge pierces the inner peripheral surface of the blank case. The above-described borderline is not a short line perpendicular to the circumferential direction of the blank case, but is a comparatively long line also extending in the circumferential direction of the blank case. Thus, when re-cutting of the cutting-start portion occurs, thread-like long chips are generated. Therefore, when these chips are left attached to the battery case, an external short circuit or an internal short circuit is caused. The present invention minimizes the generation of such chips.

The present invention further relates to a device, for manufacturing a battery case, in which the external diameter of the internal blade is set so as to render the clearance between the cutting edge of the above-described internal blade and the inner peripheral surface of the blank case in the range of 20 µm to 50 µm.

Because the clearance between the cutting edge of the toroidal internal blade and the inner peripheral surface of the blank case is set to a relatively small value, collapse or swaying of the blank case at the time of cutting can be prevented, and the proportion of fracture surface in the cut surface can be reduced. With a small proportion of fracture surface, the generation of burrs due to the fracture of the material can be reduced. Therefore, when storing the electrode plate group in the battery case, the danger of damaging the electrode plate group is reduced, minimizing the occurrence of quality defects.

The present invention further relates to a device for manufacturing a battery case, wherein the above-described blank case supporting means includes a pair of spindles that are coaxially disposed, the pair of spindles including one spindle on which the blank case is fitted, and the other spindle including a recess portion in which the bottom portion of the blank case is fitted. The blank case supporting means supports the blank case by sandwiching the bottom portion of the blank case with the above-described one spindle and the other spindle.

By thus supporting the blank case by sandwiching the bottom portion of the blank case, even if a large cut resistance is generated, the deflection of the spindle can be minimized, and the cutting can be performed without displacing or swaying the blank case. Also, compared with the case where the side wall portion of the blank case is held for support, the area of contact between the blank case and the supporting means can be reduced. In this way, the blank case is less likely to be damaged, and a disadvantageous appearance is caused less frequently.

The present invention further relates to a device for manufacturing a battery case, wherein the above-described other spindle includes a magnetic force generating means that generates a magnetic force so as to attract the blank case fitted in the above-described recess portion.

By thus attracting the blank case by the magnetic force generating means to the other spindle, the blank case can be cut without induced swaying of the blank case by rotational vibration or cut resistance. In this way, the blank case can be cut while keeping the amount of cutting by the external blade constant. Furthermore, because the blank case can be fitted onto the one spindle while keeping the attraction by the magnetic force on the blank case on the other spindle, the steps are made easy. Furthermore, after completing the cutting step, when removing the blank case that is fitted onto the above-described one spindle, the magnetic force can be used for the removal, which enables the smooth execution of the manufacturing steps.

The present invention further relates to a device for manufacturing a battery case, wherein the ratio of the circumferential velocity of the cutting edge of the external blade relative to the circumferential velocity of the inner peripheral surface of the blank case is in the range of 1.0 to 1.2.

By thus setting their circumferential velocities, when cutting the blank case while sandwiching the can with the internal blade and the external blade, the cutting can be performed without causing slipping between the two blades and the blank case. In this way, the height of burrs in the cut surface can be further minimized.

The present invention further relates to a device for manufacturing a battery case, wherein at least the portion of the above-described other spindle abutting the blank case is configured from a non-magnetic material, and the above-described magnetic force generating means includes a permanent magnet buried in the portion configured from the non-magnetic material.

By thus making the portion of the other spindle abutting the blank case from a non-magnetic material, the magnetization of that portion by the permanent magnet can be minimized. Therefore, by removing the permanent magnet for maintenance, an alien metal substance attached thereto can be easily removed.

The present invention further relates to a device for manufacturing a battery case, wherein the above-described one spindle extendably stores a case removal pin that is urged toward the above-described other spindle, to push and remove the blank case fitted thereon by allowing the leading end thereof to abut the bottom portion of the blank case from inside.

In this way, after completing the step of cutting the unwanted portion, the blank case fitted onto the above-described one spindle can be removed smoothly.

Embodiment 1

Hereinafter, a battery case manufacturing device according to Embodiment 1 of the present invention is described with reference to the drawings.

Figure 2:
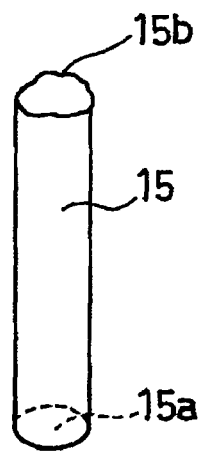
FIG. 2 is a perspective view illustrating the exterior of a blank case of a battery case to be processed by the above manufacturing device.
Figure 3:
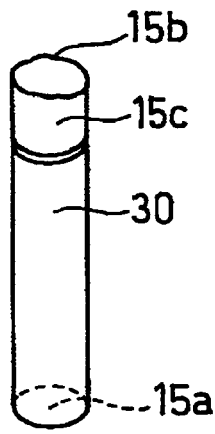
FIG. 3 is a perspective view illustrating the exterior of a blank case after being processed by the above manufacturing device.

FIG. 1 shows a cross sectional view of the battery case manufacturing device according to Embodiment 1. FIG. 2 shows a perspective view of a blank case to be cut processed by the manufacturing device. FIG. 3 shows the blank case after being cut-processed by the manufacturing device.

A manufacturing device 10 is a device for manufacturing a battery case 30 by cut processing a cylindrical blank case 15 including a bottom portion 15a. To be more specific, the manufacturing device 10 is a device that performs shaping by cutting an earring 15b that is formed at the opening portion of the blank case 15 by the drawing and ironing process, and cuts off an unwanted portion 15c in the proximity of the opening portion so that a blank case 15 that is formed slightly longer in advance has a predetermined size.

The manufacturing device 10 shown in the figure includes an upper spindle 11, a lower spindle 12 that is disposed coaxially with the upper spindle 11, and an external blade supporting shaft 13. The upper spindle 11, the lower spindle 12, and the external blade supporting shaft 13 are rotated by a driving source such as an electric motor and the like, which is not shown. The terms "upper" and "lower" showing the positional relationships of the members are used for convenience in the case of the device shown in the figure, and do not limit the present invention.

The upper spindle 11 is a shaft that rotatably supports an internal blade 18 abutting the case wall of the blank case 15 from inside, and rotatably supports the blank case 15 in cooperation with the lower spindle 12. The external blade supporting shaft 13 is a shaft that rotatably supports an external blade 28 abutting the case wall of the blank case 15 from outside.

Hereinafter, each of these elements is described further in detail.

The upper spindle 11 is configured from a substantially columnar can placing portion 14 on which the bottomed cylindrical blank case 15 is fitted, and a base portion 16 that supports the can placing portion 14. The toroidal internal blade 18 is disposed between the can placing portion 14 and the base portion 16.

An internal thread, which is not shown, is provided at the inner peripheral portion of the internal blade 18, while an external thread, which is not shown and is to be screwed into the internal thread of the internal blade 18, is formed at a projected portion 16a provided at the leading end side (lower side) of the base portion 16 of the upper spindle 11. By tightening the internal blade 18 onto the external thread, the internal blade 18 is fixed onto the base portion 16. Also, at the rear side end portion (upper end portion) of the can placing portion 14, an internal thread, which is not shown and is to be screwed onto the external thread that is provided at the projected portion 16a of the base portion 16, is formed. By tightening the internal thread onto the projected portion 16a of the base portion 16 after the internal blade 18, the internal thread of the internal blade 18 is fixed, so as not to be loose. The fixing structure of the internal blade 18 to the upper spindle 11 shown here is an example, and the present invention is not limited thereto. The fixing structure of the internal blade 18 to the upper spindle 11 may be any structure, as long as the internal blade 18 can be fixed to the upper spindle 11 with the required strength.

Although the cutting edge (edge portion) of the internal blade 18 is not clearly shown in the figure, the cutting edge is formed so as to encompass the rim of the upper end portion of the internal blade 18, and the distance from the leading end (lower end) of the can placing portion 14 to the cutting edge of the internal blade 18 is set according to the inner length of the battery case.

Figure 4:
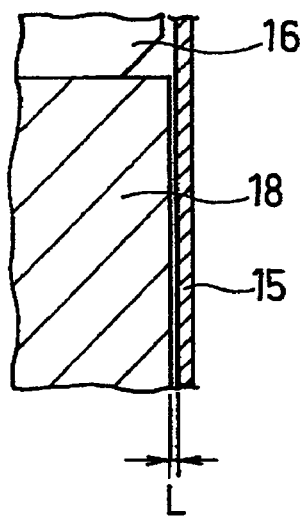
FIG. 4 is a cross sectional view illustrating a clearance between an internal blade and a blank case.

As shown in FIG. 4, the external diameter of the internal blade 18 is set so that clearance L between the cutting edge of the internal blade 18 and the inner peripheral surface of the blank case 15 is 20 to 50 µm along the entire circumference. In this way, the height of burrs generated by cutting can be minimized.

Furthermore, a pin inserting hole (not shown) is provided in the upper spindle 11, so as to penetrate the center vertically, and a case removal pin 24 is stored vertically movably in the hole. The case removal pin 24 is for press removing the blank case 15 from the can placing portion 14 by allowing the leading end (lower end) of the case removal pin 24 to abut from inside the bottom portion 15a of the blank case 15 that is fitted onto the can placing portion 14. The case removal pin 24 is urged in the lower direction by an elastic body 26. For the elastic body 26, spring or rubber can be used. Also, instead of the elastic body 26, the case removal pin 24 may be urged by an air cylinder.

The lower spindle 12 is coaxially provided with the upper spindle 11, being arranged rotatably so as to rotate at the same speed as that of the upper spindle 11, and arranged so as to be vertically movable. The lower spindle 12 is configured from a can bottom fit portion 21 that is disposed so as to oppose the can placing portion 14, and a base portion 20 that removably supports the can bottom fit portion 21. A recess portion 21a that fits the bottom portion of the blank case 15 is formed on the can bottom fit portion 21, on the face thereof opposing the can placing portion 14.

The can bottom fit portion 21 is configured from a non-magnetic material (for example, stainless steel, aluminum alloy, or resin), and one or a plurality of magnets 22 for holding the blank case 15 through the attraction of magnetic force are buried therein. When the plurality of magnets 22 are to be provided, the magnets 22 are preferably disposed on a plane that is perpendicular to the shaft center of the upper spindle 11 and the lower spindle 12.

The lower end (not shown) of the lower spindle 12 is attached to an actuator that is configured from an air cylinder and the like, and the lower spindle 12 is pressed toward the upper spindle 11 by the actuator with a constant pressure, with the blank case 15 interposed therebetween. Note that such a pressing mechanism is not limited to an air cylinder, and a mechanically sizing mechanism may also be used.

Figure 13:
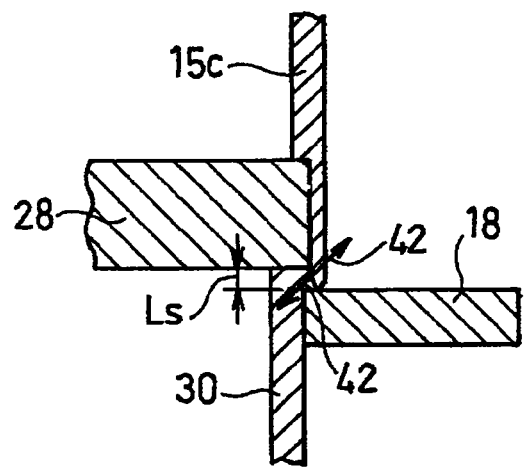
FIG. 13 is a cross sectional view illustrating the state of a cutting-start point when cut processing a blank case by the above device.

The external blade supporting shaft 13 is arranged so as to be parallel to the upper spindle 11 and the lower spindle 12, with a predetermined distance to the upper spindle 11 and the lower spindle 12. A flanged external blade attachment portion 13a is provided at the lower end of the external blade supporting shaft 13, and the arc-shaped external blade 28 is attached to the external blade attachment portion 13a. The external blade 28 is not disposed to exactly oppose the internal blade 18, and, although not clearly shown in the figure, the external blade 28 overlaps the internal blade 18 with a predetermined clearance (ref. FIG. 13 to be described later), and cuts the case wall of the blank case 15 along the circumferential direction.

Figure 5:
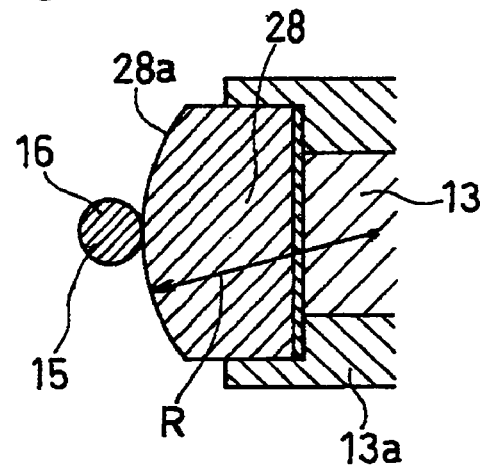
FIG. 5 is a cross sectional view illustrating a configuration of an external blade.

FIG. 5 shows a cross sectional view of the external blade 28 taken along line V-V in FIG. 1. The length of an edge portion (cutting edge) 28a of the external blade 28, and turning radius R of the edge portion 28a are set according to the external peripheral length of the blank case 15. The upper spindle 11, the lower spindle 12, and the external blade supporting shaft 13 are connected through gears, and are rotated by the above-described driving source. The gear ratio is set so that the ratio of the circumferential velocity of the edge portion 28a of the external blade 28 relative to the circumferential velocity of the inner peripheral surface of the blank case 15 is in the range of 1.0 to 1.2. In this way, slipping between the blank case 15 and the internal blade 18 is curbed when cutting the case wall of the blank case 15 along the circumferential direction.

Next, a step of processing the blank case 15 using the manufacturing device 10 is described.

FIG. 6 to FIG. 9 show, in order, the steps of processing the blank case 15 using the manufacturing device 10.

First, as shown in FIG. 6, the blank case 15 is placed on top of the can bottom fit portion 21 of the lower spindle 12. At this time, the bottom portion 15a of the blank case 15 is placed so as to fit in the recess portion 21a of the can bottom fit portion 21. In such a state, the bottom portion 15a of the blank case 15 is attracted by the magnet 22 buried in the can bottom fit portion 21. In this way, the blank case 15 is held by the lower spindle 12 with the opening portion of the blank case 15 facing upward, so as to match the shaft center of the blank case 15 with the shaft center of the upper spindle 11.

At this time, the leading end portion of the case removal pin 24 is sticking out from the leading end of the can placing portion 14 of the upper spindle 11 by the urging force of the elastic body 26.

Figure 7:
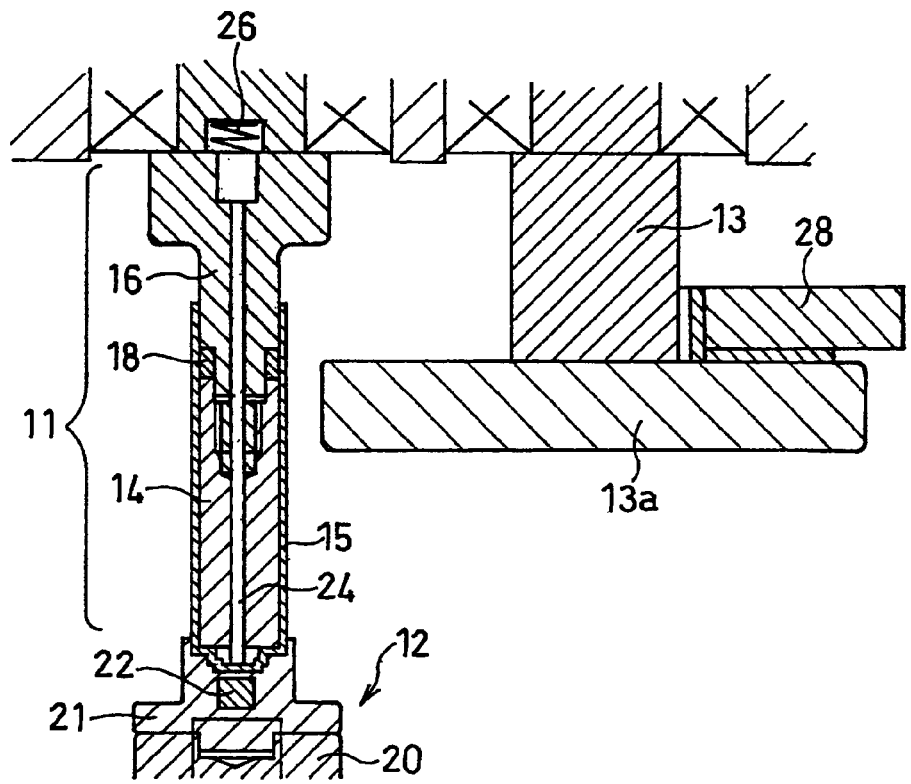
FIG. 7 is a cross sectional view of the above manufacturing device for performing cutting processing, when the above manufacturing device is completely supporting a blank case.

Next, as shown in FIG. 7, the lower spindle 12 ascends to a position where the bottom portion 15a of the blank case 15 abuts the leading end portion of the can placing portion 14, so as to fit the blank case 15 onto the upper spindle 11. In this way, the blank case 15 is fixed, being sandwiched between the can placing portion 14 of the upper spindle 11 and the can bottom fit portion 21 of the lower spindle 12 while the bottom portion 15a is fitted in the recess portion 21a of the can bottom fit portion 21 of the lower spindle 12. Because the blank case 15 is fixed in this way, collapsing and swinging of the blank case 15 are prevented when cutting the case wall of the blank case 15 along the circumferential direction.

At this time, the case removal pin 24 including the leading end portion thereof is stored inside the upper spindle 11, being pushed up by the bottom portion 15a of the blank case 15.

Figure 8:
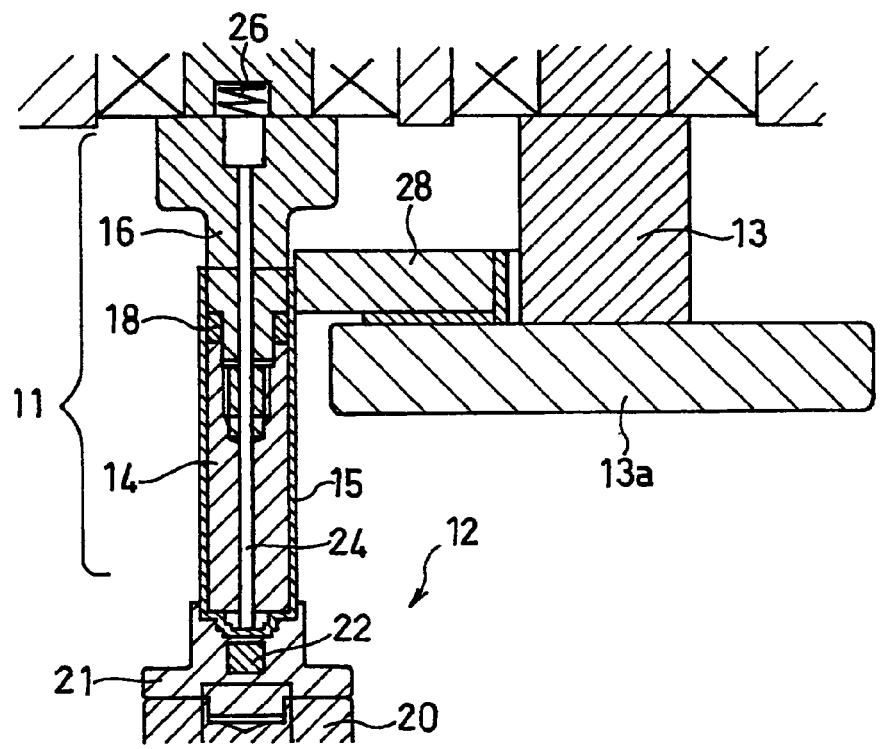
FIG. 8 is a cross sectional view of the above manufacturing device for performing cut processing, at the time of starting the cutting.

Next, as shown in FIG. 8, the external blade supporting shaft 13 is rotated so as to allow the external blade 28 to abut the case wall of the blank case 15. Thereafter, the external blade supporting shaft 13 is further rotated, and the case wall of the blank case 15 is cut along the circumferential direction so that the unwanted portion 15c is cut off. At the same time, the internal blade 18 is rotated by the upper spindle 11, and the blank case 15 is also rotated by the rotation of the upper spindle 11 and the lower spindle 12.

At this time, the external blade supporting shaft 13 is rotated in the direction opposite to that of the upper spindle 11 and the lower spindle 12, so that the feeding direction of the external blade 28 is the same as the feeding direction of the internal blade 18 and the blank case 15.

Figure 9:
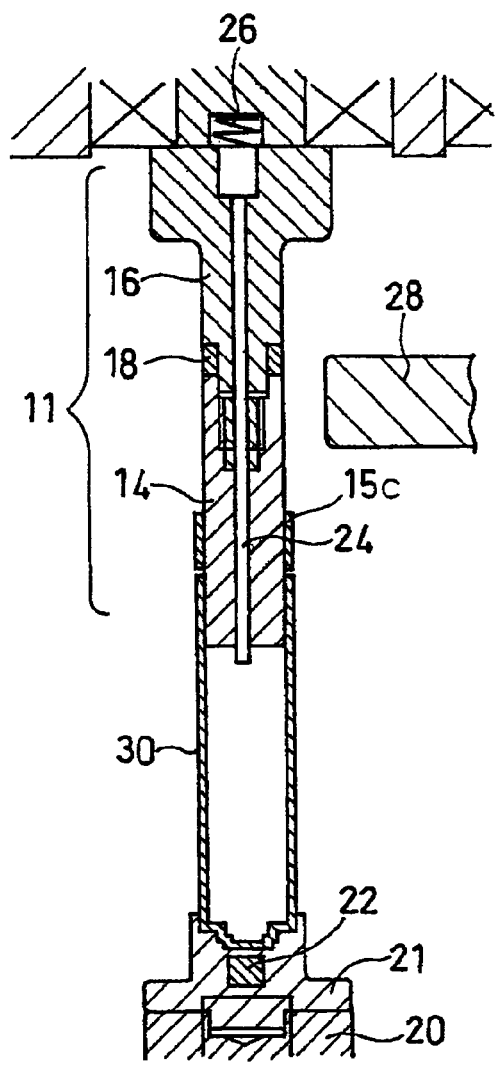
FIG. 9 is a cross sectional view of the above manufacturing device for cut processing, when removing the blank case after completing the cutting.

When the cutting step has been completed, the lower spindle 12 descends to the initial position shown in FIG. 6. FIG. 9 shows the state in the middle of the descent.

In this way, the battery case 30 made from the blank case 15 is attracted by the magnet 22 buried in the can bottom fit portion 21 of the lower spindle 12, and is drawn away from the upper spindle 11.

At this time, the leading end of the case removal pin 24 is stuck out from the leading end of the can placing portion 14 by the urging force of the elastic body 26, helping the removal of the battery case 30 from the upper spindle 11. At this time, the unwanted portion 15c also drops from the upper spindle 11 along with the battery case 30.

Figure 10:
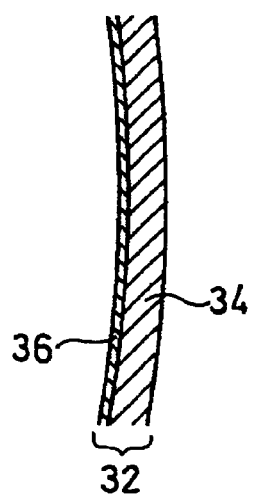
FIG. 10 is a plan view of an enlarged cut surface cut processed by the above manufacturing device.

FIG. 10 shows an enlargement of the cut surface of the opening portion of the battery case 30. A cut surface 32 shown as an example in the figure is configured of an outer peripheral side shear surface 34 and an inner peripheral side fracture surface 36. The shear surface 34 is a portion actually cut by the blade, that is, the portion to which shear processing is performed with a blade. The fracture surface 36 is a plane formed by fracture due to tensile stress. The case wall of the blank case 15 that has became thin as the shear processing progresses is pressed by the external blade 28 and pushed in toward the inside of the blank case 15, and tensile stress in the direction toward inside is generated on the remaining case wall.

Figure 11:
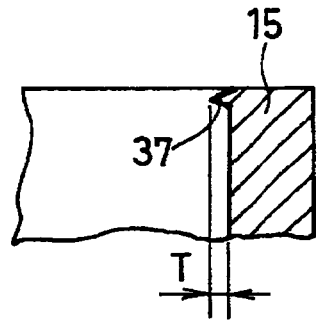
FIG. 11 is a vertical cross sectional view of a relevant part of a battery case illustrating a burr in the cut surface formed by cut processing by the above manufacturing device.

FIG. 11 shows a burr formed at the time of cutting. Because a burr 37 is generated by the tearing of the material of the blank case 15 at the fracture surface 36 toward the inner side, as shown in FIG. 11, the burrs 37 are formed so as to project toward the inner side of the blank case 15.

The proportion of the shear surface 34 relative to the entire cut surface 32 is preferably in the range of 0.5 to 0.9. According to this proportion, the proportion of the fracture surface 36 relative to the entire cut surface 32 is preferably 0.5 to 0.1. In the manufacturing device according to Embodiment 1, by minimizing the rotational vibration and cut resistance while cutting the blank case 15, the blank case can be cut without shaking in the radial direction, keeping the amount cut by the external blade the same all the time. Thus, the proportion of the shear surface 34 to the entire cut surface 32 can be maintained at 0.5 to 0.9. As a result, the height of burrs can also be minimized to 20 µm or less.

If the height of burrs can be minimized to 20 µm or less, danger of burrs piercing the separator can be reduced greatly. The reason for this is that the thickness of a separator in general use is about 20 µm. Considering the safety margin, the height of burrs is further preferably minimized to 15 µm or less.

Hereinafter, descriptions are given of Examples in which battery cases were manufactured actually using the manufacturing device according to Embodiment 1. Note that the present invention is not limited to the Examples below.

EXAMPLES

Examples 1 to 4, Comparative Examples 1 to 3

A blank case 15 with an inner diameter of 18.0 mm, a side wall thickness of 0.2 mm, and a height of 70 mm was made by drawing and ironing a cold rolled steel plate. A battery case was made using the blank case 15 with the procedures shown in FIG. 6 to FIG. 9. 1000 battery cases were made for each example, setting the clearance L between the inner peripheral surface of the blank case 15 and the edge portion of the internal blade 18 to 10 µm (Comparative Example 1), 20 µm (Example 1), 30 µm (Example 2), 40 µm (Example 3), 50 µm (Example 4), 60 µm (Comparative Example 2), and 70 µm (Comparative Example 3).

The ratio of the circumferential velocity of the edge portion 28a of the external blade 28 relative to the circumferential velocity of the inner peripheral surface of the blank case 15 was set to 1.0.

Then, for the 7000 battery cases made in total, height T of the burrs 37 at the inside of the opening rim portion and the proportion of fracture surface relative to the entire cut surface were measured, and the average value of the measured values was calculated for each size of clearance L. The results of the calculation are shown in Table 1.

TABLE 1

|  | Clearance L (µm) | Proportion of Fracture surface | Height Of Burrs (µm) |
| --- | --- | --- | --- |
| Comp. Ex. 1 | 10 | 0.05 | 10 |
| Ex. 1 | 20 | 0.10 | 10 |
| Ex. 2 | 30 | 0.20 | 10 |
| Ex. 3 | 40 | 0.30 | 9 |
| Ex. 4 | 50 | 0.50 | 12 |
| Comp. Ex. 2 | 60 | 0.60 | 18 |
| Comp. Ex. 3 | 70 | 0.65 | 22 |

As is clear from Table 1, in Examples 1 to 4 and Comparative Example 1 with a clearance of 50 µm or less, the proportion of fracture surface was minimized to 0.50 or less. Also, the height of burrs was minimized to 15 µm or less.

In contrast, in Comparative Examples 2 and 3 with a clearance of 60 µm or more, the proportion of fracture surface exceeded 0.50. In Comparative Example 2, the height of burrs exceeded 15 µm, and in Comparative Example 3, the height of burrs exceeded 20 µm. The causes are probably due to an excessively wide clearance L between the inner peripheral surface of the blank case 15 and the outer peripheral portion of the internal blade 18, which caused the case wall of the blank case 15 to bend inside when starting the cutting, generating fracture upon performing the shear processing by the external blade 11. In this way, a large tensile stress is applied to the case wall when sufficient shear processing is not yet performed, generating a large fracture surface, and causing the height of burrs to be tall.

On the other hand, although the proportion of the fracture surface and the height of burrs were reduced in Comparative Example 1 with a clearance L of 10 µm, a problem was caused in that with an excessively small clearance L, when drawing out the battery case from the upper spindle 11, the burrs 37 were caught by the internal blade 18 and the battery case failed to be smoothly removed.

Based on the results above, the clearance L is preferably set to 20 to 50 µm, to minimize the burrs 37 and in view of easy removal/attachment of the blank case/battery case from/to the upper spindle.

Examples 5 to 7, Comparative Examples 4 to 6

Battery cases were made in the same manner as in Examples 1 to 4 using the blank case 15 as used in Examples 1 to 4. 1000 battery cases were made for each example, setting the ratio of the circumferential velocity of the edge portion 28a of the external blade 28 relative to the circumferential velocity of the inner peripheral surface of the blank case 15 to 0.8 (Comparative Example 4), 0.9 (Comparative Example 5), 1.0 (Example 5), 1.1 (Example 6), 1.2 (Example 7), and 1.3 (Comparative Example 6).

Clearance L between the inner peripheral surface of the blank case and the outer peripheral portion of the internal blade was set to 20 µm.

Then, for the 6000 battery cases made in total, the heights of the burrs 37 at the inside of the opening rim portion were measured, and the average value of the measured values was calculated for each circumferential velocity ratio. The results of the calculation are shown in Table 2.

TABLE 2

|  | Circumferential Velocity Ratio | Height of Burrs (µm) |
| --- | --- | --- |
| Comp. Ex. 4 | 0.8 | — |
| Comp. Ex. 5 | 0.9 | — |
| Ex. 5 | 1.0 | 10 |
| Ex. 6 | 1.1 | 11 |
| Ex. 7 | 1.2 | 12 |
| Comp. Ex. 6 | 1.3 | 21 |

As is clear from Table 2, when the ratio of circumferential velocity of the external blade 28 was 1.0 to 1.2, the height of burrs could be minimized to 20 µm or less. In contrast, in Comparative Example 6, with a ratio of the circumferential velocity of the external blade 28 of 1.3, the height of the burrs 37 exceeded 20 µm.

In Comparative Examples 4 and 5 with the ratio of the circumferential velocity of the external blade 28 of 0.9 or less, the external blade 28 could not follow the revolving speed of the blank case 15, causing the edge portion 28a of the external blade 28 to be shaved and worn by the blank case 15, and thus failed to complete the cut processing.

Therefore, in order to minimize the height of burrs while extending the life of the blade used for the cutting, the ratio of the circumferential velocity of the external blade 28 relative to the circumferential velocity of the inner peripheral surface of the blank case 15 is preferably set in the range of 1.0 to 1.2.

Example 8, Comparative Examples 7 to 9

Battery cases were made in the same manner as in Examples 1 to 4 using the blank case 15 as used in Examples 1 to 4.

For the case where a case removal pin 24 was provided in the upper spindle 11 and one magnet 22 was provided in the lower spindle 12 (Example 8), cut processing was performed 100 times, and the number of times when the battery case was not ejected from the upper spindle 11 after processing automatically was counted (referred to as "removal failure").

Also, for the case where only the case removal pin 24 was provided (Comparative Example 7), for the case where only the magnet 22 was provided (Comparative Example 8), and for the case where both the case removal pin 24 and the magnet 22 were not provided (Comparative Example 9), cut processing was performed 100 times and the number of the times where the battery case was not ejected automatically from the upper spindle 11 after processing was counted.

The results of the above are shown in Table 3.

The ratio of the circumferential velocity of the edge portion 28a of the external blade 28 relative to the circumferential velocity of the inner peripheral surface of the blank case 15 was set to 1.0, and the clearance L between the inner peripheral surface of the blank case 15 and the edge portion of the internal blade 18 was set to 20 μm.

TABLE 3

| | Case removal pin | Magnet | Removal Failure Frequency (Number of Times) |
|---|---|---|---|
| Ex. 8 | Present | Present | 0 |
| Comp. Ex. 7 | Present | Absent | 10 |
| Comp. Ex. 8 | Absent | Present | 10 |
| Comp. Ex. 9 | Absent | Absent | 80 |

As is clear from Table 3, in Example 8 including both the case removal pin 24 and the magnet 22, no removal failure for the blank case 15 from the upper spindle 11 occurred. When only one of the case removal pin 24 and the magnet 22 was present (Comparative Examples 7 and 8), removal failure occurred 10 times in Comparative Examples 7 and 8. When both the case removal pin 24 and the magnet 22 were not present, removal failure occurred 80 times.

In Example 8, removal failure did not occur probably because, by pushing the bottom portion of the blank case 15 from inside with the case removal pin 24, and further attracting the bottom portion to the lower spindle 12 with the magnet 22, the blank case 15 could be removed parallel to the shaft center of the upper spindle 11. As a result, the blank case 15 could be removed smoothly without the internal blade 18 catching the burrs 37 and without increasing contact resistance between the inner peripheral surface of the blank case 15 and the upper spindle 11.

In contrast, in Comparative Examples 7 and 8, in which only one of the case removal pin 24 and the magnet 22 was provided, compared with Comparative Example 9, in which no case removal pin 24 and magnet 22 was provided, although removal failure was significantly reduced, the removal failure was not completely minimized.

Based on the above results, it is apparently preferable that both the case removal pin 24 and the magnet 22 are provided.

Example 9

A blank case 15 having the same size as that of the blank case 15 of Examples 1 to 4 was made from aluminum, and 1000 battery cases were made using the blank case in the same manner as in Examples 1 to 4 (Example 9).

The ratio of the circumferential velocity of the edge portion 28a of the external blade 28 relative to the circumferential velocity of the inner peripheral surface of the blank case 15 was set to 1.0, and the clearance L between the inner peripheral surface of the blank case 15 and the edge portion of the internal blade 28 was set to 20 μm.

Then, for the 1000 battery cases made, the height of burrs inside the opening rim portion was measured, and the average value of the measured values was calculated. As a result, the average height of the burrs 37 was 8 μm.

Thus, it was confirmed that the height of burrs could be set to 20 μm or less even if the material of the blank case 15 was changed to aluminum.

Embodiment 2

Next, a manufacturing device of Embodiment 2 of the present invention is described with reference to the drawings.

Figure 12:
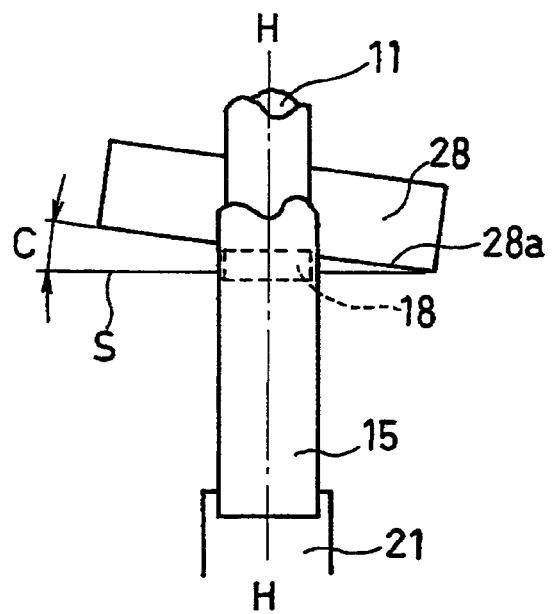
FIG. 12 is a side view illustrating an enlarged relevant part of a manufacturing device used for the method for manufacturing a battery case according to Embodiment 2 of the present invention.

FIG. 12 shows an external blade 28A of the manufacturing device according to Embodiment 2, seen in the direction of arrow A in FIG. 1. The external blade 28A is attached to the external blade supporting shaft 13 so that the ridgeline of the edge portion 28a tilts an angle C at maximum relative to a plane S that is perpendicular to the shaft center H-H of the upper spindle 11 supporting the blank case 15. The tilt direction is set so that the position of the edge portion 28a abutting the blank case 15 at the end of the cutting is higher than the position of the edge portion 28a abutting the blank case 15 at the start of the cutting.

Figure 14:
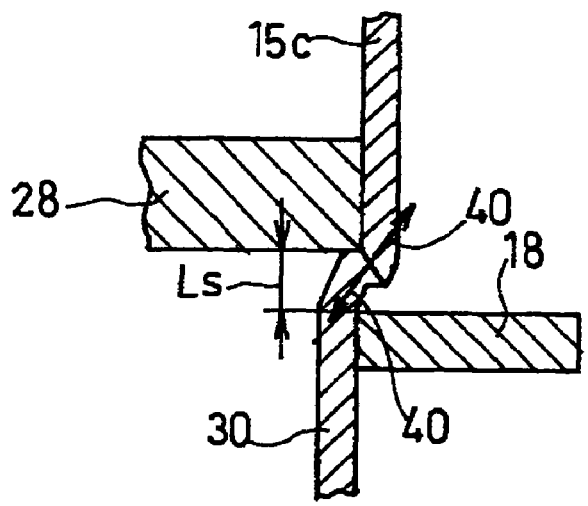
FIG. 14 is a cross sectional view illustrating the state of a cutting-end point when cut processing the blank case by the above device.

As a result, as shown in FIG. 13 and FIG. 14, clearance Ls between the internal blade 18 and the external blade 28 in the ending period of cutting (ref. FIG. 14) is larger than clearance Ls in the initial period of cutting (ref. FIG. 13).

Figure 15:
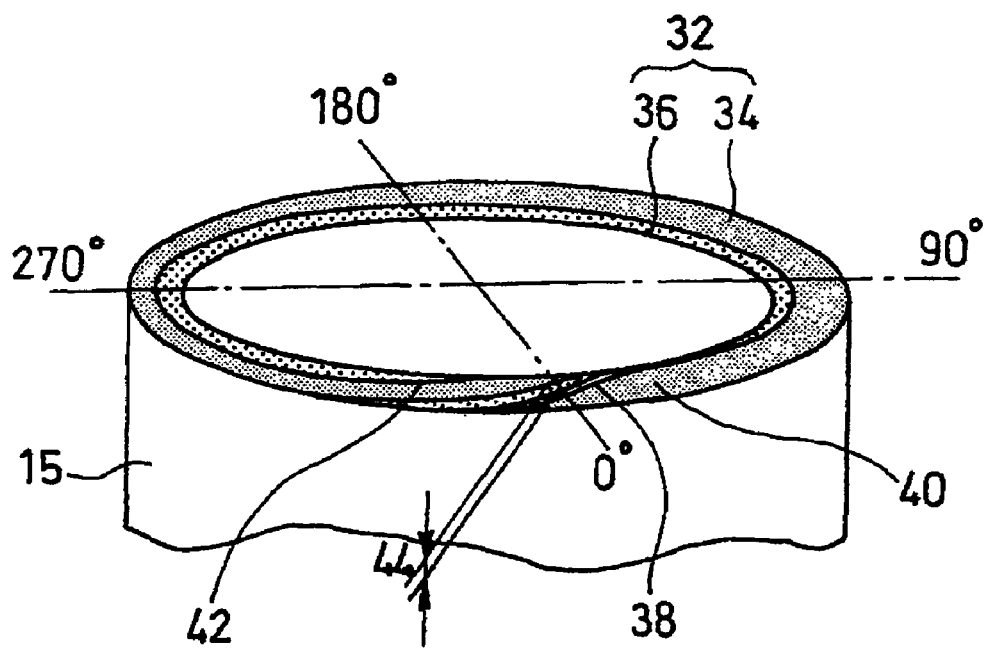
FIG. 15 is a perspective view of an enlarged cut surface cut processed by the above manufacturing device.

As a result, as shown in FIG. 15, the ratio of the shear surface 34 relative to the fracture surface 36 of the cut surface 32 changes in the circumferential direction of the blank case 15. The reason is because when clearance Ls between the internal blade 18 and the external blade 28 increases, the proportion of the shear surface 34 tends to decrease while the proportion of the fracture surface 36 tends to increase.

To be more specific, when the above-described clearance Ls is wide, as shown in FIG. 14, the case wall of the blank case 15 pushed by the external blade 28 tends to escape inward without being cut. As a result, the thickness of the case wall of the blank case 15 to be shear processed by the external blade 28 is reduced. On the other hand, tensile stress in the direction shown by arrow 40 on the case wall of the blank case 15 increases, making the fracture surface of the case wall larger.

On the other hand, as shown in FIG. 13, when clearance Ls is small, even with the pressing by the external blade 28, the case wall of the blank case 15 does not easily escape inward, increasing the thickness of the portion of the case wall of the blank case 15 to be shear processed by the external blade 28. As a result, the tensile stress applied to the case wall of the blank case 15 in the direction shown by arrow 42 becomes small, and the fracture surface 36 becomes narrow.

Furthermore, when changes are made so as to increase the clearance Ls from the cutting-start position toward the cutting-end position, as shown in FIG. 15, a cutting-end portion 42 of the cut surface 32 becomes taller than a cutting-start portion 40 of the cut surface 32 by a height difference 44.

The cutting-start portion 40 and the cutting-end portion 42 of the cut surface 32 refer to both ends of a track 38 of the edge portion 28a of the external blade 28, from the start of the cutting by abutting the case wall of the blank case 15 until the piercing the case wall of the blank case 15 by the external blade 28.

The angles shown in FIG. 15 are the angles along the direction of cutting the case wall of the blank case 15, setting the cutting-start position as 0°.

Thus, because the height of the cutting-end portion 42 is higher than the cutting-start portion 40 in the cut surface 32, re-cutting of the cutting-start portion 40 is avoided. In this way, the generation of thread-like chips can be minimized.

Hereinafter, a description is given of a lithium ion secondary battery as a non-aqueous secondary battery using a battery case manufactured by the manufacturing device of the above-described Embodiment 1 or 2. The present invention is not limited to lithium ion secondary batteries, and can be applied to any battery using a bottomed cylindrical battery case, such as dry cell batteries, lithium primary batteries, and nickel-metal hydride storage batteries.

Figure 16:
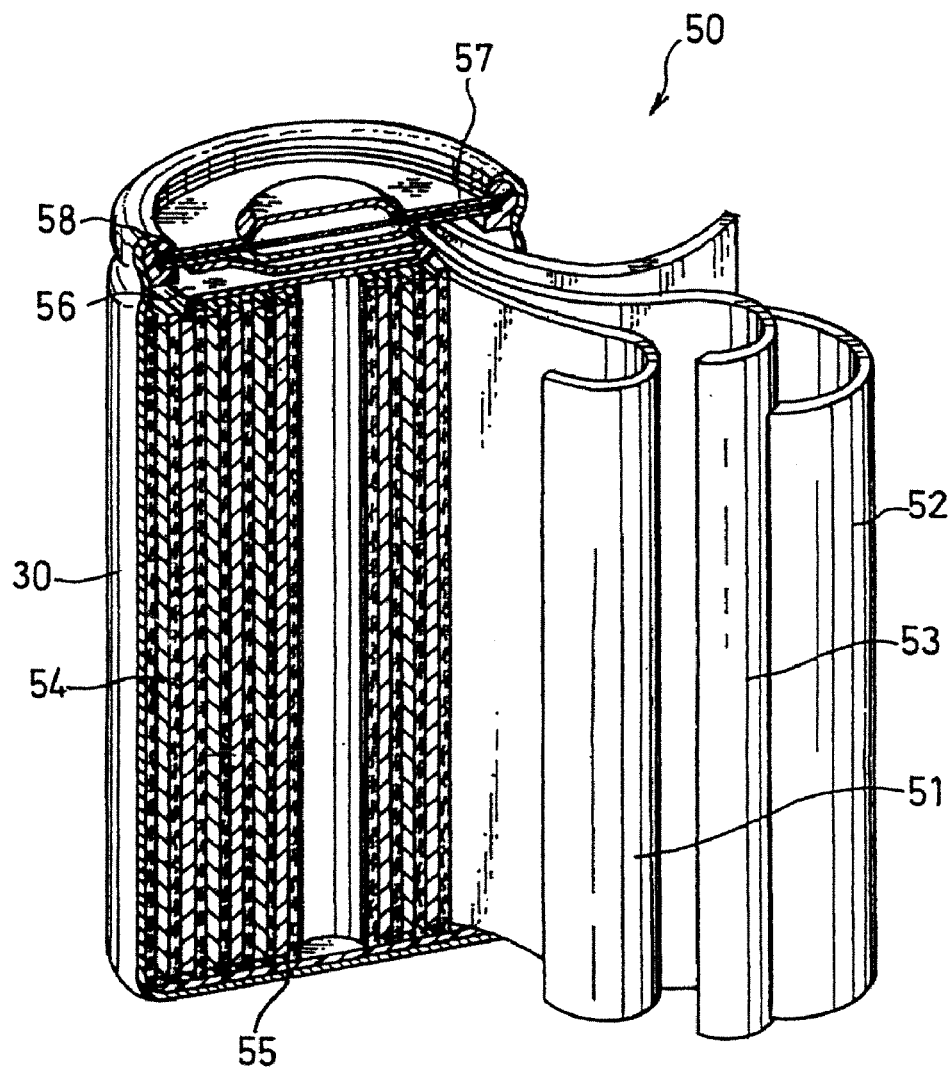
FIG. 16 is a perspective view illustrating a battery, partially cutaway, made by using a battery case manufactured according to embodiments of the present invention.
Figure 17:
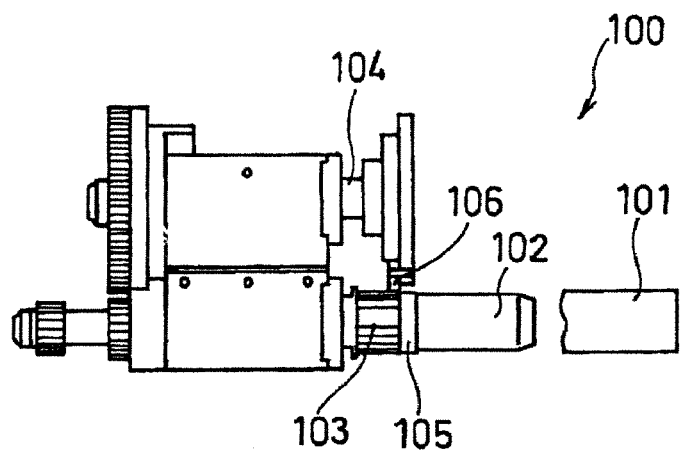
FIG. 17 is a front view of an example of a conventional can manufacturing device.
Figure 18:
FIG. 18 is a plan view illustrating an enlarged cut surface of a case wall formed by the conventional can manufacturing device.

First, a configuration of an electrode plate of a lithium ion secondary battery 50 is described with reference to FIG. 16. A positive electrode plate 51 includes a positive electrode current collector made of aluminum or aluminum alloy foil, or nonwoven fabric having a thickness of 5 μm to 30 μm. A positive electrode material mixture slurry is prepared by mixing and dispersing a positive electrode active material, a conductive material, and a binder in a dispersion medium using a disperser such as a planetary mixer. The positive electrode material mixture slurry is applied onto one or both sides of the above-described positive electrode current collector, dried, and rolled entirely, thereby making the positive electrode plate 51.

For the positive electrode active material, for example, lithium cobaltate and modified lithium cobaltate (a solid solution lithium cobaltate with aluminum or magnesium incorporated therein, etc.), lithium nickelate and modified lithium nickelate (lithium nickelate whose nickel atoms is/are partly replaced with cobalt, etc.), and lithium manganate and modified lithium manganate may be used. For the conductive material, for example, a carbon black such as acetylene black, ketjen black, channel black, furnace black, lamp black, thermal black, or various graphites is used singly or in combination. For the positive electrode binder, for example, polyvinylidene fluororide (PVdF) and modified PVdF; polytetrafluoroethylene (PTFE); or a rubber particle binder having an acrylate unit is used.

A negative electrode plate 52 includes a negative electrode current collector made of a rolled copper foil, an electrolytic copper foil, or a nonwoven fabric of copper fiber having a thickness of 5 μm to 25 μm. A negative electrode material mixture slurry is prepared by mixing and dispersing a negative electrode active material, a binder, and as necessary a conductive material and a thickener in a dispersion medium using a disperser such as a planetary mixer. The negative electrode material mixture slurry is applied onto one or both sides of the above-described negative electrode current collector, dried, and rolled entirely, thereby making the negative electrode plate 52.

For the negative electrode active material, a material capable of retaining lithium is used. For example, various natural graphites and artificial graphites, or a silicon composite material such as silicide, and various alloy composition materials may be used. For the binder, PVdF and modified PVdF, and various binders may be used, but to improve lithium ion acceptance, styrene-butadiene copolymer rubber (SBR) particles and modified SBR are preferably used. For the thickener, a viscous material can be used, such as an aqueous solution of polyethylene oxide (PEO) or polyvinyl alcohol (PVA). To improve the dispersion characteristics and viscosity of the material mixture slurry, a cellulose resin such as carboxymethyl cellulose (CMC) or a modified cellulose resin is preferably used.

As the non-aqueous electrolyte to be included in the battery case 30 along with the positive electrode plate 51 and the negative electrode plate 52, various lithium compounds such as $LiPF_6$ and $LiBF_4$ may be used as an electrolyte salt dissolved in a non-aqueous solvent. For the non-aqueous solvent, ethylene carbonate (EC), dimethyl carbonate (DMC), diethyl carbonate (DEC), and methyl ethyl carbonate (MEC) may be used singly or in combination. Furthermore, to accelerate formation of an excellent film on the positive electrode plate and the negative electrode plate, and to assure stability at the time of overcharging, vinylene carbonate (VC) or cyclohexylbenzene (CHB), modified or unmodified, are preferably added to the electrolyte.

Next, a structure of the lithium ion secondary battery 50 is described. An electrode plate group 54 is made by winding the positive electrode plate 51 and the negative electrode plate 52 with a separator 53 interposed therebetween. The electrode plate group 54 is stored in a bottomed cylindrical battery case 30 along with an insulating plate 55. A negative electrode lead, which is not shown, drawn out from the lower portion of the electrode plate group 54 is connected to the bottom portion of the battery case 30. Then, the positive electrode lead 56 drawn out from the upper portion of the electrode plate group 54 is connected to a sealing plate 57. After injecting a predetermined amount of a non-aqueous electrolyte (not shown) into the battery case 30, the sealing plate 57 with a sealing gasket 58 at the peripheral rim thereof was attached to the opening portion of the battery case 30, and the opening portion of the battery case 30 was sealed by clamping inward.

Hereinafter, a description is given of an example in which a battery case is actually manufactured by using the manufacturing device according to Embodiment 2. Note that the present invention is not limited by the Examples below.

Example 10

1000 battery cases were made using the blank case 15 as used in Examples 1 to 4, and setting angle C in FIG. 12 to 0.1° at the time of performing cut processing.

For the 1000 battery cases, the height difference 44 shown in FIG. 15 was measured, and the heights of burrs 37 were measured at positions with different angles from the cutting-start portion shown in FIG. 15 (0°, 90°, 180°, and 270°). Furthermore, the cut surface 32 was examined by using a microscope and the presence or absence of chips generated by re-cutting the cutting-start portion of the cut surface 32 was checked. Also, the proportion of the fracture surface at each angle from the above-described cutting-start was checked. The results are shown in Table 4.

TABLE 4

| Angle | Height Difference (μm) | Presence or Absence of Chips | Height of Burrs (μm) | Proportion of Fracture surface |
|---|---|---|---|---|
| 0° | 10 to 50 | Absent | 7 to 16 | 0.15 |
| 90° | — | — | 4 to 6 | 0.18 |

TABLE 4-continued

| Angle | Height Difference (μm) | Presence or Absence of Chips | Height of Burrs (μm) | Proportion of Fracture surface |
|---|---|---|---|---|
| 180° | — | — | 4 to 6 | 0.20 |
| 270° | — | — | 5 to 8 | 0.40 |

As shown in Table 4, at the position of angle 0°, the height difference 44 was within the range of 10 to 50 μm. Furthermore, for all the battery cases, no chips were confirmed at the position of angle 0°. The chips were not generated probably because, by performing cutting with tilt angle C given to the external blade 28, the cut surface 32 was formed so that the cutting-end portion 42 was at a higher position than the cutting-start portion 40, thereby preventing re-cutting of the cutting-start portion 40.

Furthermore, height T of the burrs 37 was the highest at the position of angle 0°, i.e., 7 to 16 μm. In contrast, at the positions of angles 90°, 180°, and 270°, the height of the burrs 37 was 8 μm at maximum. The height of the burrs 37 was the tallest at the position of angle 0° due to the fact that because the cutting-start portion 40 and the cutting-end portion 42 overlap at the position of angle 0°, so the height of the burrs 37 at the cutting-end portion 42 with a large clearance Ls becomes tall.

Furthermore, the proportion of the fracture surface 36 in the cut surface 32 changes in the range of 0.15 to 0.40 so as to increase from the position of angle 0° toward angle 270°. The proportion of the shear surface 34 changes according to such an increase, in the range of 0.85 to 0.60. The reason is probably because clearance Ls changed from the cutting-start portion 40 toward the cutting-end portion 42 in the cut surface 32.

Furthermore, it is difficult, in reality, to set angle C to 0.1° or less in order to set the height difference 44 shown in FIG. 15 to 10 μm or less, and the possibility of re-cutting emerges when such setting is made forcefully. To be more specific, it is possible to hold the blank case 15 without swaying by improving mechanical precision so as to minimize shaft runout, plane runout, and the like of the external blade 28, and upper and lower spindles 11 and 12. However, an attempt to achieve such causes an increase in production costs, due to a significant increase in facility costs. On the other hand, when the height difference 44 was 50 μm or more, the clearance between the internal blade 18 and the external blade 28 increases, increasing the proportion of the fracture surface 36 as described. This causes the height of the burrs 37 to become 20 μm or more, and generates the possibility of piercing the separator 53. Thus, in view of productivity and safety, the height difference 44 is preferably 10 to 50 μm.

Thus, by adjusting tilt angle C of the external blade 28 so that the height difference 44 is within the range of 10 to 50 μm, the generation of chips is minimized, the proportion of fracture surface is minimized in the range of 0.15 to 0.40, and the height of burrs can be set to 20 μm or less, i.e., a general separator thickness. In this way, when inserting the electrode plate group in the battery case, the burrs 37 piercing the separator, short circuiting the positive electrode and the negative electrode, and thermal runaway of the battery can be avoided.

Example 11

In Example 11, a lithium ion secondary battery was made using the battery case made in Example 10.

First, a positive electrode material mixture slurry was made by mixing and kneading 100 parts by weight of lithium cobaltate as the positive electrode active material, 2 parts by weight of acetylene black as the conductive material, and 2 parts by weight of polyfluorovinylidene as the binder along with an appropriate amount of N-methyl-2-pyrrolidone with a double-armed kneader.

Next, a positive electrode plate precursor was made by applying the slurry on both sides of an aluminum foil positive electrode current collector with a thickness of 15 μm: one side of the material mixture layer had a thickness of 100 μm after drying. Furthermore, the positive electrode plate was pressed so that the total thickness thereof was 165 μm. Thus, the thickness of one side of the material mixture layer became 75 μm. Afterwards, the positive electrode plate was made by performing slit processing on the above-described precursor to give a predetermined width.

Furthermore, a negative electrode material mixture slurry was prepared by mixing, with a double-armed kneader, 100 parts by weight of artificial graphite as the negative electrode active material, 2.5 parts by weight (1 part by weight of the solid content of the binder) of styrene-butadiene copolymer rubber particle dispersion (solid content 40 wt %) as the binder, and 1 part by weight of carboxymethyl cellulose as the thickener, along with an appropriate amount of water. Then, a negative electrode plate precursor was made by applying the slurry on both sides of a copper foil negative electrode current collector with a thickness of 10 μm: one side of the material mixture layer had a thickness of 100 μm after drying.

Furthermore, the precursor was pressed so that the total thickness thereof was 170 μm. Thus, the thickness of one side of the material mixture layer became 80 μm. Afterwards, the negative electrode plate was made by performing slit processing on the above-described precursor to give a predetermined width.

An electrode plate group was formed by winding the positive electrode plate and the negative electrode plate with a separator having a thickness of 20 μm interposed therebetween, and cutting the wound product to give a predetermined length. The electrode plate group was inserted into the above-described battery case. Afterwards, a cylindrical lithium ion secondary battery was made by injecting a non-aqueous electrolyte made by dissolving 1M of $LiPF_6$ and 3 parts by weight of VC in a mixed solvent of EC, DMC, and MEC, and sealing the battery case. Thus, 100 lithium ion secondary batteries were made.

Then, an internal short circuit test was carried out for all of the manufactured lithium ion secondary batteries. In the test, first, a voltage of 250 V was applied between the positive electrode terminal and the negative electrode terminal, and the internal resistance was measured by a tester, and the number of lithium ion secondary batteries with insulation failure, in which the internal resistance was 100 mΩ or less, was counted.

As a result, there was no battery in which insulation failure was detected. This is probably because chips were not generated from re-cutting of the cutting-start portion in the cut surface 32, or the height of burrs was kept small.

Industrial Applicability

The present invention can provide a battery using a battery case in which there are no thread-like chips that are generated by re-cutting the cutting-start portion of the cut surface when cutting the unwanted portion, and the height of the burrs generated at the time of cutting is low. Therefore, because safety can be improved, the present invention is suitable for application in lithium ion secondary batteries, for which improvements in safety are particularly in demand.

The invention claimed is:

1. A battery case made by cutting away an unwanted portion from a blank case of a bottomed cylindrical battery case having the unwanted portion at an opening portion,
   wherein a cutting-end portion is closer to the opening portion of the blank case than a cutting-start portion in a cut surface formed by cutting a case wall of said blank case in a circumferential direction so as to cut off said unwanted portion.

2. The battery case in accordance with claim 1, wherein said cutting-end portion is closer to the opening portion of the blank case than said cutting-start portion by 10 to 50 μm in said cut surface.

3. The battery case in accordance with claim 1, wherein:
   said cut surface comprises a shear surface and a fracture surface, and
   a ratio of an area of said shear surface relative to an area of said entire cut surface is in the range of 0.90 to 0.50.

4. A battery formed by inserting a positive electrode, a negative electrode, a separator interposed between said positive electrode and said negative electrode, and an electrolyte into the battery case in accordance with claim 1.

5. The battery in accordance with claim 4, wherein:
   said positive electrode comprises a positive electrode plate made by applying a positive electrode material mixture slurry onto a positive electrode current collector, the positive electrode material mixture slurry being made by kneading and dispersing an active material containing a lithium-containing composite oxide, a conductive material, and a first binder in a first dispersion medium;
   said negative electrode comprises a negative electrode plate made by applying a negative electrode material mixture slurry onto a negative electrode current collector, the negative electrode material mixture slurry being made by kneading and dispersing an active material comprising a material capable of retaining lithium and a second binder in a second dispersion medium; and
   said electrolyte comprises a non-aqueous electrolyte.

6. A method for manufacturing a battery case by cutting away an unwanted portion from a blank case of a bottomed cylindrical battery case having the unwanted portion at an opening portion,
   wherein said step of cutting the unwanted portion is performed by cutting a case wall of said blank case in a circumferential direction so as to render a cutting-end portion closer to the opening portion of the blank case than a cutting-start portion in a cut surface.

7. A device for manufacturing a battery case by cutting away an unwanted portion from a blank case of a bottomed cylindrical battery case having the unwanted portion at an opening portion, the device comprising:
   a blank case supporting means that supports said blank case rotatably;
   a circular internal blade that abuts a case wall of said blank case from inside;
   an internal blade supporting means that supports the internal blade rotatably;
   an arc-shaped external blade that abuts the case wall of said blank case from outside so as to overlap said internal blade with a predetermined clearance in therebetween; and
   an external blade supporting means that rotatably supports the external blade;
   wherein said external blade is shaped so that in a cut surface formed by cutting the case wall of said blank case in a circumferential direction with said internal blade and said external blade, a cutting-end portion is closer to the opening portion of the blank case than a cutting-start portion.

8. The device for manufacturing a battery case in accordance with claim 7, wherein said external blade is formed so that a ridgeline of a cutting edge extending in the circumferential direction of rotation tilts away from a plane perpendicular to an axial direction of rotation.

9. The device for manufacturing a battery case in accordance with claim 7, wherein an external diameter of said internal blade is set so that a clearance between the cutting edge of said internal blade and an inner peripheral surface of said blank case is in a range of 20 μm to 50 μm.

10. The device for manufacturing a battery in accordance with claim 7,
    wherein said blank case supporting means comprises:
    a pair of spindles that are coaxially disposed, said pair of spindles including a first spindle on which said blank case is fitted, and a second spindle including a recess portion in which a bottom portion of said blank case is fitted; and
    said blank case being supported by said first spindle and said second spindle so as to sandwich the bottom portion of said blank case.

11. The device for manufacturing a battery case in accordance with claim 10, wherein said second spindle comprises a magnetic force generating means that generates a magnetic force so as to attract said blank case fitted in said recess portion.

12. The device for manufacturing a battery case in accordance with claim 7, wherein a ratio of a circumferential velocity of a cutting edge of said external blade relative to a circumferential velocity of an inner peripheral surface of said blank case is within a range of 1.0 to 1.2.

13. The device for manufacturing a battery case in accordance with claim 11, wherein at least a portion where said recess portion is provided in said second spindle is comprised of a non-magnetic material, and said magnetic force generating means comprises a permanent magnet buried in the portion.

14. The device for manufacturing a battery case in accordance with claim 10, wherein said first spindle extendably stores a case removal pin that is urged toward said second spindle, so as to push and remove said blank case fitted thereon by allowing a leading end thereof to abut said bottom portion of said blank case from inside.

* * * * *